(12) United States Patent
Grywacheski et al.

(10) Patent No.: US 7,070,498 B2
(45) Date of Patent: Jul. 4, 2006

(54) FRUSTO-CONICAL DRUM INFEED AND THRESHING REGION FOR A COMBINE ROTOR

(75) Inventors: Sheldon Joseph Grywacheski, Eldridge, IA (US); Glenn Everett Pope, Viola, IL (US); Jason Michael Healy, Port Byron, IL (US); Jeffrey Ray Payne, Cordova, IL (US); Ryan Scott Herlyn, Prophetstown, IL (US); Ryan Patrick Mackin, Milan, IL (US); Kevin Laverne Ehrecke, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/629,298

(22) Filed: Jul. 29, 2003

(65) Prior Publication Data

US 2005/0026663 A1     Feb. 3, 2005

(51) Int. Cl.
*A01F 12/00*    (2006.01)
(52) U.S. Cl. ...................................................... 460/68
(58) Field of Classification Search ................. 460/46, 460/66, 68, 70, 119
See application file for complete search history.

(56) References Cited

U.S. PATENT DOCUMENTS

| | | | |
|---|---|---|---|
| 3,827,443 A | 8/1974 | Drayer | 460/16 |
| 4,139,013 A | 2/1979 | Hengen | |
| 4,148,323 A | 4/1979 | McMillen et al. | 460/70 |
| 4,178,943 A | 12/1979 | West | 460/80 |
| 4,266,560 A | 5/1981 | Powell et al. | 130/27 T |
| 4,274,426 A | 6/1981 | Williams | 130/27 T |
| 4,353,376 A * | 10/1982 | Schuler | 460/67 |
| 4,422,463 A | 12/1983 | West | 130/27 HA |
| 4,489,733 A * | 12/1984 | Underwood | 460/68 |
| 4,889,517 A | 12/1989 | Strong et al. | 460/66 |
| 5,145,462 A * | 9/1992 | Tanis et al. | 460/68 |
| 5,376,047 A | 12/1994 | Harden et al. | 460/121 |
| 5,454,758 A * | 10/1995 | Tophinke et al. | 460/68 |
| 5,562,540 A * | 10/1996 | Balmer | 460/65 |
| 5,919,086 A | 7/1999 | Derry | 460/72 |
| 6,036,598 A | 3/2000 | Harden et al. | 460/66 |
| 6,050,894 A * | 4/2000 | Johnson | 460/68 |
| 6,083,102 A | 7/2000 | Pfeiffer et al. | 460/68 |
| 6,296,566 B1 * | 10/2001 | Tanis et al. | 460/70 |
| 6,688,970 B1 | 2/2004 | Tanis | 460/68 |

* cited by examiner

*Primary Examiner*—Arpád Fábián Kovács

(57) ABSTRACT

A rotor, in an agricultural harvester crop processing unit, comprising a drum to which crop processing elements for an infeed section and a threshing section are affixed. The drum comprises a rearward cylindrical portion and a forwardly extending frusto-conical portion. The frusto-conical portion is divided into an aft-region adjacent to the rearward cylindrical portion of the drum, and a fore-region. The infeed section has at least one infeed element located on the fore-region of the frusto-conical portion of the drum. The crop processing section has at least one crop processing element located on the aft-region of the frusto-conical portion of the drum.

8 Claims, 2 Drawing Sheets

FRUSTO-CONICAL DRUM INFEED AND THRESHING REGION FOR A COMBINE ROTOR

FIELD OF THE INVENTION

The present invention is directed to a combine rotor having both infeed and threshing sections on a common frusto-conical portion of the rotor drum.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section.

Rotors have been provided for combines in a variety of configurations to optimize harvesting efficiency for a wide variety of crops and crop conditions. Examples include variations on cylindrical and frusto-conical drum shapes disclosed in U.S. Pat. Nos. 4,139,013, 4,266,560, and 4,272,426.

SUMMARY OF THE INVENTION

The present invention is for a combine rotor having both infeed and threshing sections on a common frusto-conical portion of the rotor drum. The rotor in the infeed section is provided with helical infeed elements located on the fore-region of the frusto-conical portion of the drum. Immediately downstream from the infeed section, the threshing section is provided with a number of threshing elements. A portion of the threshing elements are attached to the aft-region of the frusto-conical portion of the drum, with the remaining portion being attached to the rearward cylindrical portion.

DETAILED DESCRIPTION

Figure 1:
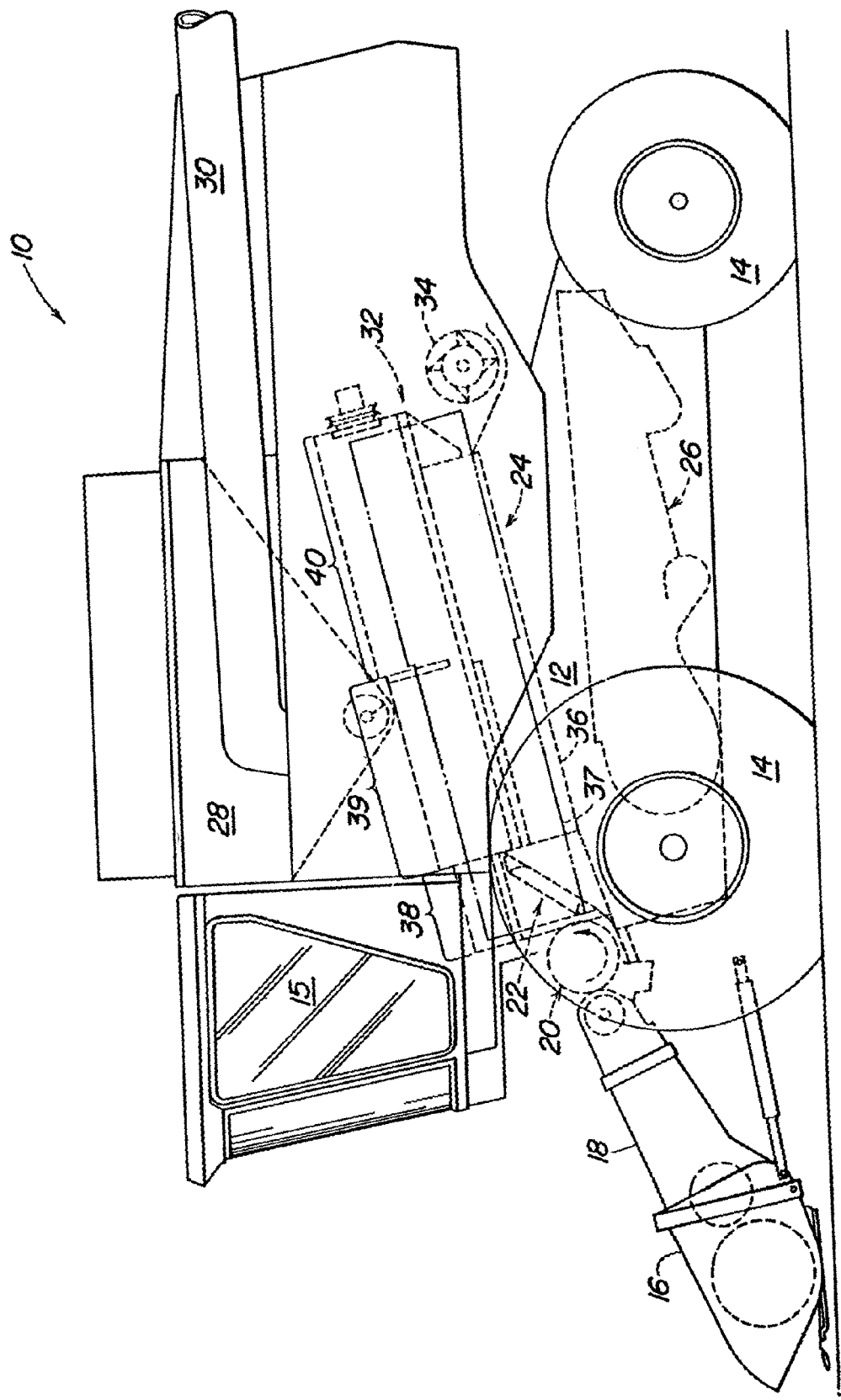
FIG. 1 is a semi-schematic side view of a rotary agricultural combine.

FIG. 1 shows an agricultural combine 10 comprising a supporting structure 12 having ground engaging wheels 14 extending from the supporting structure. The operation of the combine is controlled from operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank 28 can be unloaded into a grain cart or truck by unloading auger 30. Threshed and separated straw is discharged from the axial crop processing unit 24 through outlet 32 to discharge beater 34. The discharge beater 34 in turn propels the straw out the rear of the combine.

The axial crop processing unit 24 comprises a rotor housing 36 and a rotor 37 located inside the housing 36. The front part of the rotor 37 and the rotor housing 36 define the infeed section 38 of the crop processing unit. Longitudinally downstream from the infeed section 38 are threshing section 39 and separating section 40. The rotor 37 comprises a drum 100 to which crop processing elements for the infeed section, threshing section, and separating section are affixed. The drum 100 comprises a rearward cylindrical portion 102 and a forwardly extending frusto-conical portion 104. The surface of the frusto-conical portion 104 is divided into an aft-region 106 adjacent to the rearward cylindrical portion 104 of the drum, and a fore-region 108.

The rotor 37 in the infeed section 38 is provided with helical infeed elements 42 located on the fore-region 108 of the frusto-conical portion of the drum. The helical infeed elements 42 engage harvested crop material received from the beater 20 and inlet transition section 22. The infeed elements 42 are comprised of a forward portion 54 and a rearward portion 58. The forward portion 54 of each infeed element 42 is bolted to the drum 100 by mounting assemblies 52. The rearward portion 58 of each infeed element 42 is bolted to an infeed element attachment feature 128 extending from an adjacent threshing element 122.

Figure 2:
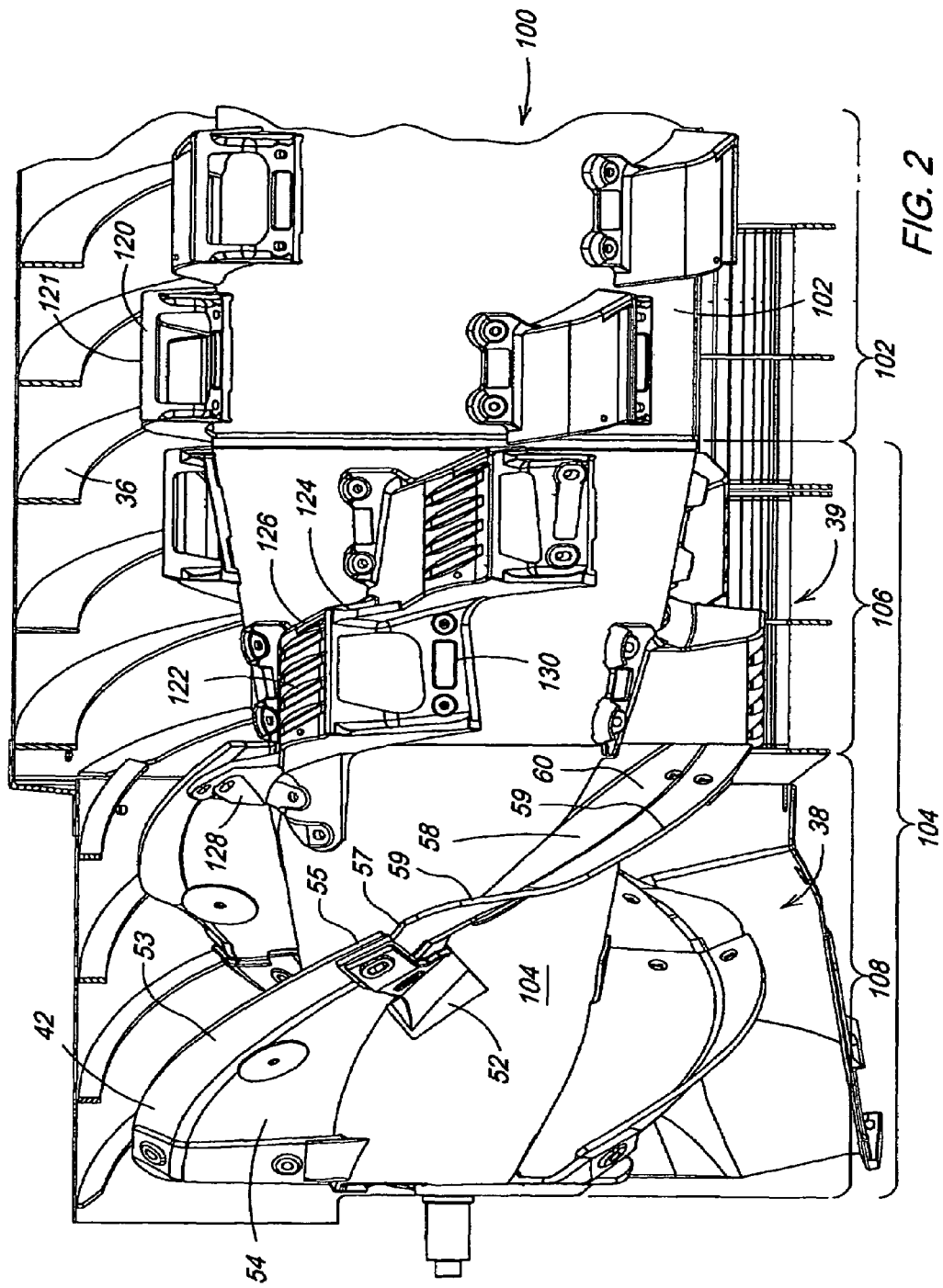
FIG. 2 is a side view of the infeed and threshing sections of the rotor.

As can be seen in FIG. 2, the forward portion 54 of each infeed element 42 has an outer edge 53 that is swept forward in the direction of rotation of the drum 100. The rearward portion 58 of each infeed element 42, is secured along its front end 57 to the mounting assembly 52 that secures the rear end 55 of the forward portion 54 of the same infeed element 42. The rearward portion 58 has a forward swept outer edge 59 at its front end 57 analogous to that on the forward portion 54 of the same infeed etement 42, which then transitions such that the outer edge 59 is swept rearward away from the direction of rotation of the drum 100 at its rear end 60. The rearward portion 58 of each infeed element 42 and the adjacent threshing element 122 are secured to an infeed element attachment feature 128. The change in angle and direction of the outer edge 59 of the reward portion 58 of the infeed element 42 serves to feed the crop directly onto the threshing element 122 on the aft region 106 of the frusto-conical portion of the drum 100 to which the rearward portion 58 of the infeed element 42 is secured.

Immediately downstream from the infeed section 38 is the threshing section 39 of the crop processing unit 24. In the threshing section 39 the rotor 37 is provided with a number of threshing elements 120 and 122 for threshing the harvested crop material received from the infeed section 38. Threshing elements 122 are attached to the aft-region 106 of the frusto-conical portion of the drum, with threshing elements 120 attached to the rearward cylindrical portion 102. The threshing elements 120 located on the cylindrical portion 102 of the drum 50 each comprise a hollow support structure with one crop engaging portion 121.

The threshing elements 122 located on the aft-region 106 of the frusto-conical portion of the drum 50 are composite threshing elements comprising a hollow support structure 124 with two outwardly extending crop engaging portions 126 that sweep a cylindrical path upon rotation of the rotor. Extending forward from the threshing element 122 is the aforementioned infeed element attachment feature 128 to which the rearward portion 58 of the adjacent infeed element 42 is attached. The base of the threshing element 122 is provided with mounting flanges 130, through which mounting bolts 57 pass for securing the threshing element 122 to the drum 100.

The threshing elements 122 are shown in the illustrated embodiment with two crop engaging portions 126 fixed in a staggered arrangement, however, they may be provided with one or more crop engaging portions 126 in a variety of arrangements. Additionally, the crop engaging portions 126 are illustrated with rasp features, but may also be provided with other surface profiles, such as that disclosed in U.S. Pat. No. 6,036,598.

The outwardly extending crop engaging portions 126 are shown in the illustrated embodiment as sweeping a cylindrical path with a common diameter to the path swept by the crop engaging portion 121 of threshing elements 120 on the rearward cylindrical portion 102 of the rotor drum. However, the crop engaging portions 126 of the composite threshing elements 122 could be adapted to sweep cylindrical path diameters different than those of the crop engaging portion 121 of threshing elements 120, or of adjacent crop engaging portions 126 of the same threshing element 122.

Having described the illustrated embodiment, it will become apparent that various modifications can be made without departing from the scope of the invention as defined in the accompanying claims.

The invention claimed is:

1. In an agricultural harvester having a crop processing unit comprising an axial rotor having an axis of rotation and a housing, the rotor comprising:
   a drum having a rearward cylindrical portion and a forwardly extending frusto-conical portion, the surface of the frusto-conical portion comprising an aft-region adjacent to the rearward cylindrical portion of the drum, and a fore-region;
   an infeed section for receiving harvested crop material, the infeed section having at least one infeed element located on the fore-region of the frusto-conical portion of the drum, each infeed element having a forward portion and a rearward portion, the forward portion having an outer edge that is forward swept in a direction of rotation of the drum, the rearward portion of the infeed element having an outer edge that is forward swept on a front thereof, the rearward portion of the infeed element transitioning such that the outer edge is rearward swept on a rear thereof;
   a threshing section for processing harvested crop material received from the infeed section of the rotor, the threshing section having at least one threshing element located on the aft-region of the frusto-conical portion of the drum, the threshing element having a crop engaging portion that is parallel to the axis of rotation; and
   wherein the rear of the rearward portion of the infeed element and the threshing element are secured to an infeed element attachment feature for directing the harvested crop material from the rearward portion of the infeed element directly onto a crop engaging portion of the threshing element.

2. The rotor described in claim 1 wherein the crop engaging portion of the threshing element of the crop processing section sweeps a cylindrical path upon rotation of the rotor.

3. The rotor described in claim 1 wherein the infeed element is a helical infeed flight.

4. The rotor described in claim 1 having at least a second threshing element located on the rearward cylindrical portion of the drum.

5. The rotor described in claim 4 wherein the threshing element of the crop processing section sweeps a cylindrical path upon rotation of the rotor.

6. An axial rotor for a crop processing unit in an agricultural harvester, the rotor having an axis of rotation and a housing, the rotor comprising:
   a drum having a rearward cylindrical portion and a forwardly extending frusto-conical portion, the surface of the frusto-conical portion comprising an aft-region adjacent to the rearward cylindrical portion of the drum, and a fore-region;
   an infeed section for receiving harvested crop material, the infeed section having at least one infeed element located on the fore-region of the frusto-conical portion of the drum each at least one infeed element having a forward portion and a rearward portion, the forward portion having an outer edge that is forward swept in a direction of rotation of the drum, the rearward portion of the infeed element having an outer edge that is forward swept on a front thereof, the rearward portion of the infeed element transitioning such that the outer edge is rearward swept on a rear thereof;
   a threshing section for processing harvested crop material received from the infeed section of the rotor, the threshing section having a plurality of first threshing elements located on the aft-region of the frusto-conical portion of the drum and positioned in a staggered pattern on the frusto-conical portion, each first threshing element having a crop engaging portion that is parallel to the axis of rotation,
   the threshing element and a rear of the rearward portion of the infeed element secured to an infeed element attachment feature for directing the harvested crop material from the rearward portion of the infeed element directly onto a crop engaging portion of the threshing element, wherein the infeed element and the first threshing element are helically orientated and are helically aligned on the frusto-conical portion
   and having a plurality of second threshing elements located on the rearward cylindrical portion of the drum.

7. The rotor described in claim 6 wherein the infeed element is a helical infeed flight.

8. The rotor described in claim 6 wherein the staggered pattern of first threshing elements of the threshing section sweeps a cylindrical path upon rotation of the rotor.

* * * * *